United States Patent [19]
Herold

[11] Patent Number: 5,890,266
[45] Date of Patent: Apr. 6, 1999

[54] CONNECTING PIN FOR BELT FASTENERS AND THE LIKE

[75] Inventor: Wolfgang Herold, Offenbach am Main, Germany

[73] Assignee: MATO Maschinen-und Metallwarenfabrik Curt Matthaei GmbH & Co. KG, Offenbach, Germany

[21] Appl. No.: 381,531

[22] Filed: Jan. 31, 1995

[30] Foreign Application Priority Data

Feb. 2, 1994 [DE] Germany ............................ 44 03 117.3
May 6, 1994 [DE] Germany ............................ 44 16 079.8

[51] Int. Cl.$^6$ ........................................................ F16G 3/02
[52] U.S. Cl. .............................. 24/33 P; 24/31 R; 16/386; 198/844.2; 474/255
[58] Field of Search .................................... 24/31 H, 31 B, 24/33 B, 33 P, 33 R, 33 C, 33 M; 198/844.2; 16/386, DIG. 13, 380; 474/255

[56] References Cited

U.S. PATENT DOCUMENTS

| | | | |
|---|---|---|---|
| 2,962,782 | 12/1960 | Beach | 16/386 X |
| 3,576,055 | 4/1971 | Gisbourne | 16/386 X |
| 4,023,239 | 5/1977 | Stolz | 24/33 P |
| 4,024,605 | 5/1977 | Henke | 16/386 X |
| 4,597,137 | 7/1986 | Droppleman et al. | 24/31 R X |
| 4,611,367 | 9/1986 | Meulenberg et al. | 24/33 P |
| 4,641,398 | 2/1987 | Schick | 24/33 P X |
| 4,671,403 | 6/1987 | Schick | 198/844.2 |
| 4,721,497 | 1/1988 | Jager | 474/255 |
| 4,793,021 | 12/1988 | Deasy et al. | 16/386 X |
| 4,964,193 | 10/1990 | Rommelfaenger et al. | 16/386 X |
| 5,038,442 | 8/1991 | Stolz et al. | 24/33 P |

FOREIGN PATENT DOCUMENTS

| | | |
|---|---|---|
| 1067315 | 12/1979 | Canada . |
| 2574510 | 6/1986 | France . |
| 2706295A1 | 8/1978 | Germany . |
| 2240013B2 | 5/1981 | Germany . |

*Primary Examiner*—Randolph A. Reese
*Assistant Examiner*—Robert J. Sandy
*Attorney, Agent, or Firm*—Price, Heneveld, Cooper, DeWitt & Litton

[57] ABSTRACT

A unique connecting pin is provided for splicing or lacing up conveyor belt segments. The connecting pin has multiple core pieces of defined lengths, aligned within the interior of a casing element. The casing element is constructed from a relatively soft material, which can give during operations, and the core pieces are aligned in such a way, that they extend through more than two coupling eyelets.

21 Claims, 2 Drawing Sheets

CONNECTING PIN FOR BELT FASTENERS AND THE LIKE

BACKGROUND OF THE INVENTION

The present invention concerns connecting pins for lacing or splicing conveyor belts and the like, and in particular to a connecting pin having core pieces of defined length which are aligned in the interior of at least one casing element.

Heretofore, the casing element of a typical belt fastener connecting pin is a casing pipe, which contains in its interior, disk shaped core pieces that are larger in diameter than in height (FR-2 574 510). Another type of coupling pin is disclosed in CA-1 067 315, which has several ribbed beads that extend lengthwise along the body of the casing element. In this instance, there is also a spiral shaped insert between the ribbed bead and the casing element, which during operation attempts to transfer the forces, which are primarily shear forces, as evenly as possible between the belt fasteners.

The prior art connecting pins have generally not been able to meet all demands placed upon them. They are typically unable to withstand the static loads occurring during operation, or especially the very high dynamic loads. These dynamic loads occur when a cleated conveyor band runs across its associated carrier rolls, and leads to rapid wear and tearing of the prior art connecting pins.

SUMMARY OF THE INVENTION

One objective of the present invention is to provide an improved connecting pin design having a prolonged operating life, even during excessively rough operations.

In the present invention a casing element is made of a relatively soft substance, which is fairly pliable during operations, and core pieces which are long enough to extend through a minimum of more than two coupling eyelets.

According to the present invention, the casing element serves merely to create a bar-shaped structure, and for inserting the core pieces into the eyelet area of the connection elements. To a certain degree, the casing element also secures the placement of the core pieces during operation. However, the casing element is not intended to be used for the transfer of existing loads powers. That is neither its purpose, nor its design, since it consists of a relatively soft material, which is rather pliable during operation. The existing loads are, therefore, exclusively transferred by the core pieces, which therefore preferably consist of a high strength material, and are cylindrical in shape.

Further characteristics of the invention will be further understood and appreciated by reference to the following claims in connection with the description and the drawings.

The present invention is described below in more detail with respect to production samples, as illustrated in the drawings.

DETAILED DESCRIPTION OF THE PREFERRED EMBODIMENTS

Figure 2:
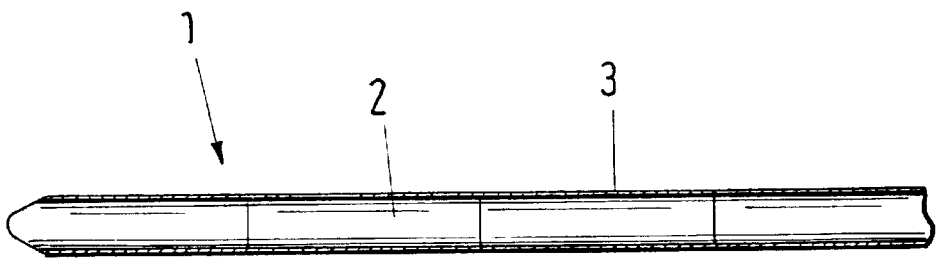
FIG. 2: A cross sectional view of the connecting pin.

According to FIG. 2, coupling bar or connecting pin 1 consists of several core pieces 2 and a casing element 3, which has a tubular shape in the nature of a casing piece, that connects and then holds core pieces 2 together. The core pieces 2 are preferably made of high strength solid material, and are all cylindrical in shape. The casing element 3 is tubular with a hollow interior, and can be a brass tube or consist of malleable steel with low rigidity, or may upon occasion even consist of synthetic material. This derives from its function, which consists of keeping the core pieces 2 correctly placed, so that core pieces 2 can fulfill their function in transferring the existing loads as intended.

Figure 1:
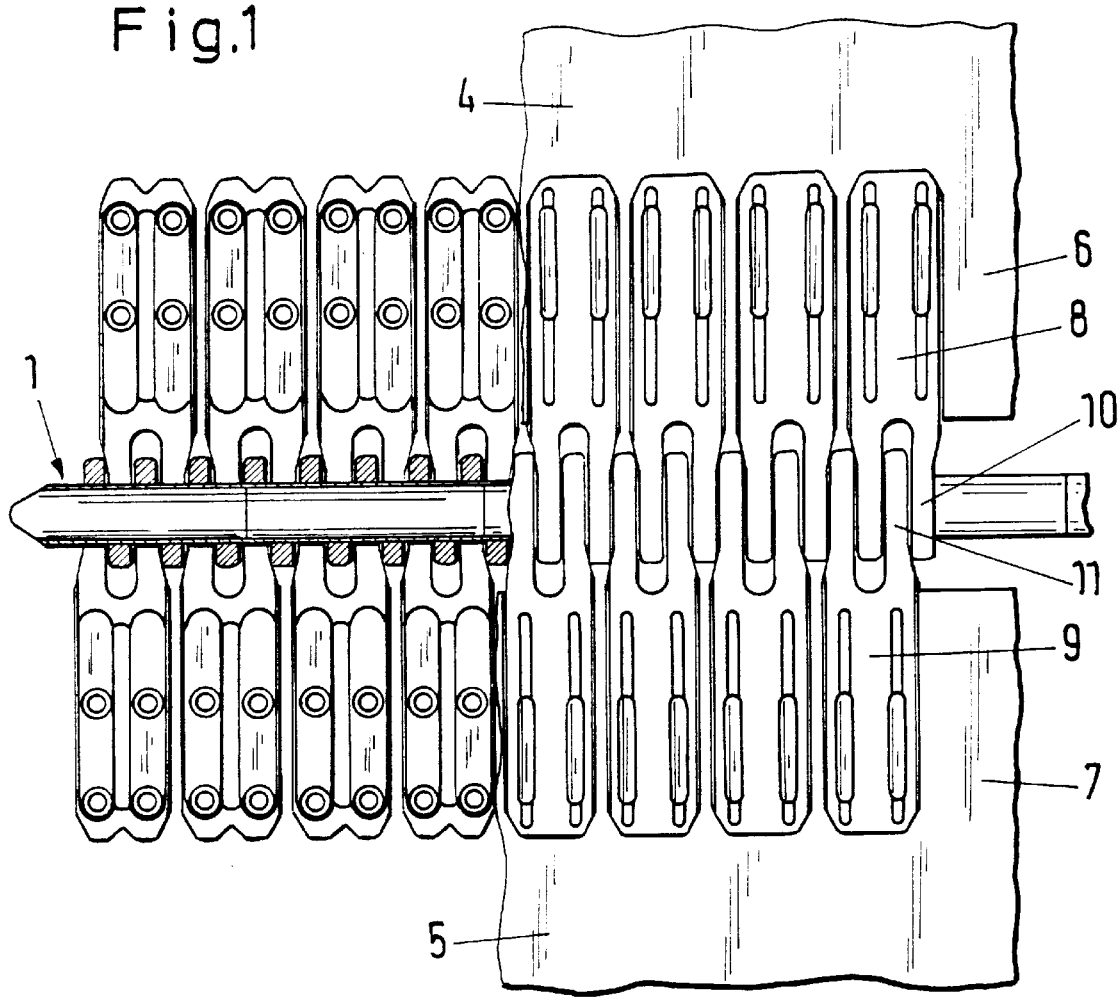
FIG. 1: A partial sectional view of the ends of two conveyor belt segments laced together with a connecting pin embodying the present invention.

For splicing or lacing up two conveyor belt segments 4 and 5, several fasteners or connecting elements 8 and 9 are arranged in rows along the conveyor belt ends 6 and 7 with the coupling eyelets 10 and 11 aligned perfectly and intermeshed for connection with a connecting pin 1, as seen in FIG. 1.

The aligned core pieces 2 (FIG. 2) are closely received and retained within the interior 12 of the casing element 3, and are all of a definite length, as measured between opposite ends thereof. Their length is selected in such a manner that they always extend through more than two adjacent ones of the coupling eyelets 10 and 11. When using the illustrated connecting elements 8 and 9, wherein each has two coupling eyelets 10 and 11, the length of the illustrated core pieces 2 equals two and a half times the width of the connecting elements 8, 9. According to the production sample shown in FIG. 2, each of the core pieces 2 extends in an axial direction in such a manner, that it extends through nine interlaced coupling eyelets 10 and/or 11, with the overall length of connecting pin 1 being such that connecting pin 1 extends through both of the end or entrance eyelets 10 and/or 11.

Figure 3:
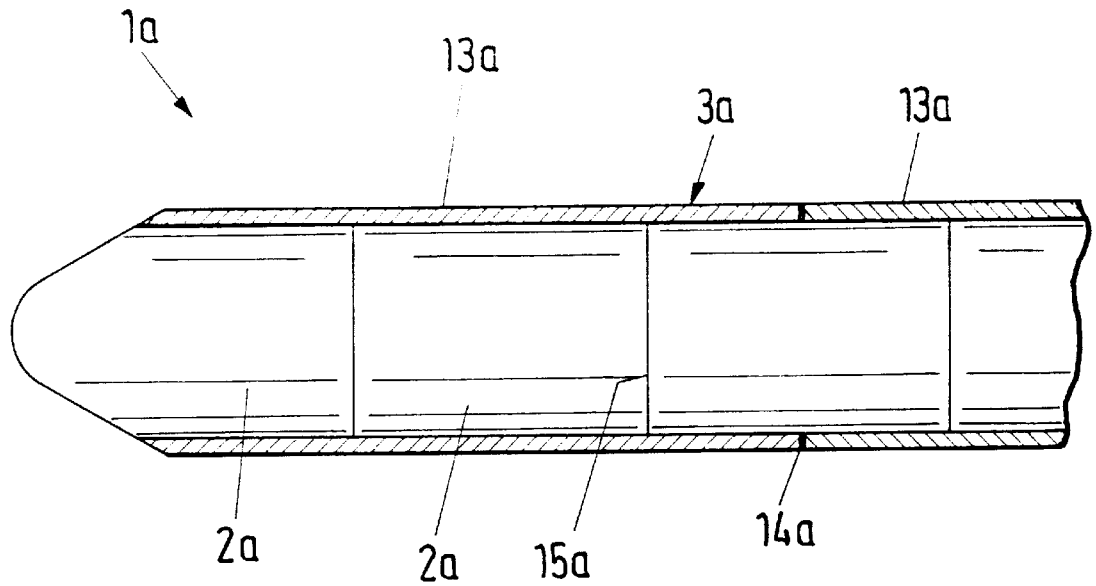
FIG. 3: A cross sectional view of a second embodiment of the connecting pin, drawn in larger dimensions.

The reference numeral 1a designates another embodiment of the present connecting pin, as shown in FIG. 3, wherein all like parts are identified with the same reference numbers, except for the additional letter index "a".

The casing element 3a of connecting pin 1a has several parts. It consists of several tubes 13a that hold core pieces 2a, and when assembled, its ends 14a are arranged off-set to the ends 15a of the core pieces 2a. In fact, the core pieces 2a, and the sectional casing elements 3a form a rather sturdy unit.

In the production sample shown in FIG. 3, the lengths of the casings 13a represent a multiple of the length of the core pieces 2a, and this multiple may be an integer, or a fractional multiple of the length of the core pieces 2a.

Figure 4:
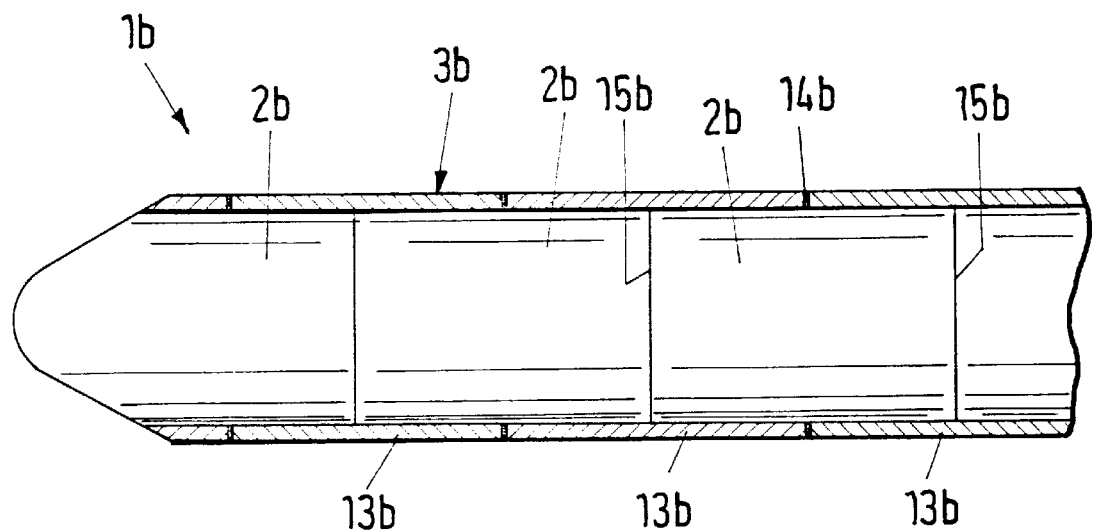
FIG. 4: A sectional view of a third embodiment of the connecting pin.

The reference numeral 1b designates another embodiment of the present connecting pin, as shown in FIG. 4, in which the same parts are also identified by the same reference numbers, and additionally carry the differentiating letter index "b". The casing elements 3b are again sectional, and again consists of several casings 13b. The casings 13b are significantly shorter than the casings 13a of the coupling bar 1a and, according to this embodiment, have the same length as the core pieces 2b. Moreover, the arrangement of the casing elements 13b forming the coupling bar 1b and that of the core pieces 2b is selected in such a manner, that the ends 14b of the casings 2b are juxtaposed roughly in the middle of the core pieces 2b, and so are spaced about equidistant to the ends 15b of the neighboring core pieces 2b.

Finally, it will be appreciated that the invention is not limited to the embodiments illustrated in the diagrams, and that there are numerous alterations and modifications possible without deviating from the essence of the invention. Such modifications are to be considered as included in the following claims, unless these claims by their language expressly state otherwise.

The embodiments of the invention in which an exclusive property or privilege is claimed are defined as follows:

1. A connecting pin adapted for use in conjunction with belt fasteners of the type having intermeshed coupling eyelets, comprising:

a plurality of core elements, each being rigid, and having a cylindrical shape extending along its length measured between opposite ends thereof, which length is greater than the distance between at least two adjacent ones of the coupling eyelets; and at least one casing element having a tubular shape with a hollow interior in which said core elements are closely received and retained in an end-to-end relationship to position each of said core elements through more than two adjacent ones of the coupling eyelets.

2. A connecting pin as set forth in claim 1, wherein:

said casing element is constructed from a relatively soft material which can deform during use.

3. A connecting pin as set forth in claim 2, wherein:

said core elements are solid, and are constructed from a high strength material.

4. A connecting pin as set forth in claim 3, wherein:

said length of each of said core elements is equal to substantially two and one-half times the distance between two adjacent ones of the coupling eyelets.

5. A connecting pin as set forth in claim 4, wherein:

at least one of said core element extends through nine adjacent ones of the coupling eyelets.

6. A connecting pin as set forth in claim 5, wherein:

said casing element has a one-piece construction.

7. A connecting pin as set forth in claims 5, wherein:

said casing element has a multi-piece construction.

8. A connecting pin as set forth in claim 7, wherein:

said casing element includes a plurality of tubular segments juxtaposed end-to-end, each of which retains at least one of said core elements therein.

9. A connecting pin as set forth in claim 8, wherein:

said casing element tubular segments each has a length measured between opposite ends thereof, which is generally commensurate with the length of one of said core elements.

10. A connecting pin as set forth in claim 8, wherein:

said casing element tubular segments each has a length measured between opposite ends thereof, which is at least twice said length of one of said core elements.

11. A connecting pin as set forth in claim 10, wherein:

said casing element tubular segments and said core elements are mutually off-set from one another.

12. A connecting pin as set forth in claim 1, wherein:

said core elements are solid, and are constructed from a high strength material.

13. A connecting pin as set forth in claim 1, wherein:

said length of each of said core elements is equal to substantially two and one-half times the distance between two adjacent ones of the coupling eyelets.

14. A connecting pin as set forth in claim 1, wherein:

at least one of said core element extends through nine adjacent ones of the coupling eyelets.

15. A connecting pin as set forth in claim 1, wherein:

said casing element has a one-piece construction.

16. A connecting pin as set forth in claim 1, wherein:

said casing element has a multi-piece construction.

17. A connecting pin as set forth in claim 1, wherein:

said casing element includes a plurality of tubular segments juxtaposed end-to-end, each of which retains at least one of said core elements therein.

18. A connecting pin as set forth in claim 17, wherein:

said casing element tubular segments each has a length measured between opposite ends thereof, which is generally commensurate with the length of one of said core elements.

19. A connecting pin as set forth in claim 17, wherein:

said casing element tubular segments each has a length measured between opposite ends thereof, which is at least twice said length of one of said core elements.

20. A connecting pin as set forth in claim 17, wherein:

said casing element tubular segments and said core elements are mutually off-set from one another.

21. A connecting pin adapted for use in conjunction with belt fasteners of the type having intermeshed coupling eyelets, comprising:

a plurality of core elements, each being rigid, and having a length measured between opposite ends thereof, which is greater than the distance between at least two adjacent ones of the coupling eyelets;

at least one casing element having a tubular shape with a hollow interior in which said core elements are closely received and retained in an end-to-end relationship to position each of said core elements through more than two adjacent ones of the coupling eyelets; and wherein said casing element includes a plurality of tubular segments juxtaposed end-to-end, each of which retains at least one of said core elements therein;

said casing element tubular segments each has a length measured between opposite ends thereof, which is at least twice said length of one of said core elements; and said casing element tubular segments and said core elements are mutually off-set from one another.

* * * * *